United States Patent Office 3,481,976
Patented Dec. 2, 1969

3,481,976
PROCESS FOR OPTICAL RESOLUTION OF
CALCIUM PANTOTHENATE
Noriyuki Okuda, Tokyo, Ieji Kuniyoshi, Ichikawa-shi, and Hisashi Tsukamoto, Tokyo, Japan, assignors to Daiichi Seiyaku Company, Limited, Tokyo, Japan, a corporation of Japan
No Drawing. Filed Feb. 1, 1967, Ser. No. 613,100
Claims priority, application Japan, Feb. 26, 1966, 11,546
Int. Cl. C07c 101/02
U.S. Cl. 260—534   2 Claims

ABSTRACT OF THE DISCLOSURE

An optical resolution of a mixture of D- and L-calcium pantothenates from a supersaturated aqueous methanol solution thereof alternately seeding the solution with one kind of crystals of the two enantiomers to separate the seeded enantiomer, said crystals having one molecular of water of crystallization and four molecules of methanol of crystallization, thus selectively and alternately crystallizing and separating the two enantiomers.

This invention relates to a process for optical resolution of racemic calcium pantothenate.

D-pantothenic acid is a chemical substance which plays an important role in a biochemical reaction in vivo as a constituent of coenzyme A, and its calcium salt has been employed as a valuable medicine. Calcine pantothenate can be produced today by chemical synthesis. The product synthesized by usual methods is, however, inevitably obtained in a racemic form and, in order to obtain optically pure D-calcuim pantothenate, an optical resolution must be carried out in an intermediate or final stage of the synthesis.

The processes hitherto known to the art for the optical resolution are in general classified in two groups. One method involves the optical resolution of $\alpha$-hydroxy-$\beta,\beta$-dimethyl-$\gamma$-butyrolactone, also referred to as pantolactone, an intermediate product of pantothenic acid, using as a resolving agent a natural alkaloid such as quinine, brucine or an amine such as phenylethylamine or galactamine (for instance U.S. Patent No. 2,319,545, U.S. Patent No. 2,390,281, German Patent No. 16,482, and British Patent No. 773,174). The other is a process which involves optically resolving the final product, i.e. pantothenic acid, using as a resolving agent a natural alkaloid such as quinine or cinchonidine, or its derivatives (R. Kuhn et al., Chem. Ber. 73, 971 and 1134 (1940); U.S. Patent No. 2,341,610; E. T. Stiller et al., J. Am. Chem. Soc. 63, 1237 (1941); and British Patent No. 554, 558).

These processes, however, cannot be deemed to be industrially advantageous because the use of said resolving agents complicates the manufacturing procedures and demands huge investments for the equipment and, moreover, the loss of the expensive resolving agents in the course of recovery and refining operations can be a materially adverse cost factor.

Accordingly, an object of the invention is to improve the optical resolution of racemic calcium pantothenate.

Another object is to provide a method for resolving racemic calcium pantothenate economically by a simple procedure.

Another object is to provide a method for resolving racemic calcium pantothenate by selective alternate crystallization of the enantiomers thereof.

A further object is to obtain D-calcium pantothenate of optically high purity in larger yields when compared with prior art procedures.

The other objects and advantages will be apparent from the following detailed description and claims.

As a result of extensive studies on the subject, it has been found that the solubility of optically active calcium pantothenate in hydrous methanol is considerably less than that of the salt of optically inactive racemate and, on the basis of the result, the process of the present invention has been completed, whereby racemic calcium pantothenate is optically resolved through a direct crystallization procedure i.e. a seeding method without the use of any resolving agent.

More particularly, the present invention is a process for the optical resolution of racemic calcium pantothenate which comprises seeding a supersaturated aqueous methanol solution of racemic calcium pantothenate with seed crystals of either D-calcium pantothenate or L-calcium pantothenate, thereby selectively and alternately crystallizing either D-calcium pantothenate or L-calcium pantothenate.

The present invention will be more fully described hereinafter.

While the soluble amounts of optically active D-calcium pantothenate and L-calcium pantothenate in 100 ml. of 98% methanol at 5° C. are, respectively, 0.23 g. and 0.25 g., that of the racemate is 55.8 g. Thus, in a aqueous methanol solution containing the antipode, the optically active salt will dissolve to a degree beyond its own solubility and will not crystallize when allowed to stand for a long time, maintaining a stable supersaturated state.

In the process of the invention, the seed crystals to be employed are optically active D-calcium pantothenate and L-calcium pantothenate crystallized from an aqueous methanol solution. On drying at a low temperature they attain a constant weight with calcium pantothenate purity 76.5% and show a loss of 23.5% on drying with heat. They melt at 55° C. and are resolidified at 70°–80° C. They have decomposition points of 195°–196° C. and $[\alpha]_D^{25} \pm (21.0$–$21.3°)$ (c.=5, $H_2O$). The crystals apparently contain crystal solvents, and the composition has been clarified by use to have one molecule of water of crystallization and four molecules of methanol of crystallization.

When an optically active salt having one molecule of water of crystallization and four molecules of methanol of crystallization is added as seed crystals to a supersaturated aqueous methanol solution of the above-mentioned racemate at a temperature below an ordinary temperature, then the seed crystals on stirring will not be dissolved in the solution but will be thoroughly dispersed, permitting deposition of crystals of the same optically active salt as the seeded one.

In contrast therewith, when the crystals of an optically active salt dried in the usual manner or recrystallized from different kinds of solvents are used as the seed crystals, they will be easily dissolved in the solution and fail to serve as such if the amount is too small. On the contrary, if the amount is too large, they will be conglomerated and will not disperse well. In the latter case, recrystallization takes place around partially undissolved crystals, and the resulting crystals containing the solvents of crystallization serve as crystal nuclei for further crystal growth. However, the rate of crystallization is low and the crystals thus separated are inferior in optical purity.

For the purpose of industrially obtaining crystals having very high optical purity in a high yield, it is necessary to use as the seed crystals those referred to above which have one molecule of water of crystallization and four molecules of methanol of crystallization. The seed crystals used in the present invention are usually those which are finely pulverised and may have a free solvent thereon, from which the crystals have been separated.

In practising the process of the invention, it is theoretically necessary that the water content of the solution is at least equimolecular to the dissolved racemic calcium pantothenate. Actually, however, the desirable racemic calcium pantothenate concentration in the solution is 20–35% w./v. and the desirable water content is in the range of 2–15, preferably 2–7% w./v. Any water content outside the above range will deprive the present invention of its economical feature.

Although an increase in the concentration of racemic calcium pantothenate will usually bring about a favorable effect, the concentration in excess of 35% w./v. will rather increase the viscosity to such an extent that difficulties will be involved in the filtration and other treatment of the solution. Furthermore, a crystallization operation with such a high concentration of racemic calcium pantothenate tends to deposit the salt of undesired antipode, thus rendering it difficult to obtain an optically active salt with high purity.

For the reasons above explained, the concentration of racemic calcium pantothenate in a solution is preferably in the range of 20–35% w./v., and most preferably of 30–33% w./v. for the purpose of an industrial process. The optically active salt to be added as seed crystals is fully effective even in an amount of about 0.5% in weight of the amount of racemic calcium pantothenate dissolved.

The crystallization temperature may be at or below an ordinary temperature, but a too low temperature is not desirable for the operation because the crystals so formed are too fine, though the crystallization rate is increased. Moreover, the optical purity of the resolved crystals is adversely affected. The crystallization temperature is, therefore, preferably in the range of 5°–15° C.

In order to carry out the optical resolution favorably by crystallization procedure, constant stirring at such a rather low speed that the separated crystals will be kept from being deposited on the bottom of the reaction vessel is required. If the solution is vigorously stirred, the excessive stimulation will partly destroy the supersaturated state of the optically active salt, lowering the optical purity of the crystals so separated. Conversely, if the stirring speed is too low, the crystals will deposit on the bottom of the reaction vessel and again give the same adverse effects.

When, under the conditions as described above, an optical active salt having one molecule of water of crystallization and four molecules of methanol of crystallization is added as seed crystals to a supersaturated aqueous methanol solution of racemic calcium pantothenate and crystals of the same optically active salt as the seeded crystals are separated, whereby optical resolution is accomplished in a favorable way.

Observing the separation of crystals or the progress of resolution in terms of the angle of rotation of the solution, the angle of rotation shows a linear change with the lapse of time and, when the supersaturated state of the salt of unseeded enantiomer begins to be broken after a certain period of time, the absolute value of the angle reaches a maximum and then trends downward.

It thus follows that, if the crystallizing operation is discontinued at the point where the salt of unseeded enantiomer is about to begin crystallizing and the crystals so formed are separated, an optically active salt of a high purity can be obtained in a maximum yield. If the crystallizing operation is controlled as above through continuous observation of the change of the rotation angle of the solution, it is possible to obtain an optically active salt of a very high purity with an absolute value of the specific rotation of more than 25°.

The crystals are recovered in a simple manner by filtration, centrifugation, or the like, and are then washed and dried if desired.

The removal of the seeded salt leaves the solution supersaturated with the unseeded salt which makes of course the solution optically active, the solution exhibiting contrary rotation to that of the separated crystals. Therefore, the salt of unseeded enantiomer having the same solvents of crystallization in the same proportion as those of the salt of seeded enantiomer can be added to the filtrate in the same as described above, thereby to crystallize the salt of the enantiomer left in the filtrate similarly in a high purity.

In order to carry out this process for optical resolution advantageously on an industrial basis, it is advisable to replenish mother liquor from which one of the salts of the enantiomers has been separated with the racemic salt in an amount corresponding to the separated salt of the enantiomer, thus selectively and alternately crystallizing the salts of the both enantiomers. When the optical resolution is accomplished by the alternate crystallization procedures as described above, optically active salts of a high purity can be obtained in a yield of 25–40% of the amount of dissolved racemic calcium pantothenate out of a solution containing racemic calcium pantothenate at a concentration of 30–33% w./v.

As described hereinbefore, the process of the invention permits to obtain optically active salt in a high yield through extremely simplified operations, providing a most beneficial industrial process with economic advantages as compared wtih the prior art techniques for chemical resolution which use expensive resolving agents.

The invention can be further illustrated by the following example which is not intended to limit the present invention.

EXAMPLE

When wet D-calcium pantothenate or L-calcium pantothenate recrystallized from aqueous methanol was dried under reduced pressure in a calcium chloride disiccator, it attained a constant weight in three to four hours. The material so dried has a melting point of 55° C. and $[\alpha]_D^{25} \pm (21.0°-21.3°)$ (c.=5, $H_2O$), and the content of calcium pantothenate amounts to about 76.5%. It was pulverized to form fine crystals, 200 mesh or less in size, as seed crystals.

400 g. of rac.-calcium pantothenate was added to about 1400 ml. of about 98% methanol, dissolved by heating at about 40° C., and filtered. To the filtrate, methanol was added to make up to a total liquid amount of 1700 ml. The concentration of calcium pantothenate in this solution was 23.5% w./v. and the water content was 2.9% w./v. To the solution, while stirring slowly at 9°–10° C., 3 g. of seed crystals of L-calcium pantothenate was added. With the lapse of time, the amount of separated crystals increased. After one hour and forty minutes since the addition of the seed crystals, the stirring was stopped and separated crystals were recovered by filtration. The crystals on drying gave 76 g. of L-calcium pantothenate, $[\alpha]_D^{25} -25.3°$ (c.=5, $H_2O$).

The filtrate, after removal of L-calcium pantothenate, had an angle of rotation of +0.93° (as determined at 20°–25° C., with wave length of 589 mμ and layer length of 5 cm. The same is applied hereinafter). To the filtrate, 200 g. of rac.-calcium pantothenate was added and dissolved at 40°–45° C., The solution was filtered and the filtrate was replenished with aqueous methanol to make up to 1700 ml., or the same amount as the original solution. The concentration of calcium pantothenate in this solution was 30.6% w./v., the water content was 3.0% w./v., and the angle of rotation was +0.73°. With slow stirring at 13°–14° C., 3 g. of seed crystals of D-calcium pantothenate was added to the solution. When allowed to crystallize over a period of three hours and ten minutes, the angle of rotation of the mother liquor dropped to −0.99°. Immediately it was filtered, and the separated crystals were washed with 240 ml. of methanol and dried. There was obtained 177 g. of D-calcium pantothenate having $[\alpha]_D^{25} +26.0°$ (c.=5, $H_2O$).

The filtrate from which D-calcium pantothenate has been separated was now replenished in the same way as described above with 200 g. of rac.-calcium pantothenate, and the resulting solution was filtered. To the filtrate, methanol was added to make up to 1700 ml. The solution had a calcium concentration of 31.2% w./v., water content of 3.2% w./v., and angle of rotation of 0.76°. While the solution was kept at 9°–10° C. and stirred slowly, 3 g. of seed crystals of L-calcium pantothenate was added. After crystallization for over a period of 3 hours, the solution showed an angle of rotation of +0.97°. It was immediately filtered and the crystals were washed with 240 ml. of methanol and dried. There was obtained 172 g. of L-calcium pantothenate having $[\alpha]_D^{25}$—25.0° (c.=5, $H_2O$).

The filtrate from which L-calcium pantothenate was separated was supplied with 190 g. of rac.-calcium pantothenate in the same manner as described above. The resulting solution was filtered and the filtrate was made up to a total amount of 1700 ml. with the addition of methanol. The solution had a concentration of calcium pantothenate of 31.5% w./v., water content of 3.0% w./v., an angle of rotation of +0.75°. While the solution was being stirred slowly at 9°–10° C., there was added 3 g. of seed crystals of D-calcium pantothenate. After crystallization for over a period of three hours, the angle of rotation of the solution dropped to —0.98°. It was filtered, and the crystals on washing with 240 ml. of methanol and drying gave 175 g. of D-calcium pantothenate having $[\alpha]_D^{25}$ +25.6° (c.=5, $H_2O$). The same procedures were thereafter repeated, whereby D-calcium pantothenate and L-calcium pantothenate could be alternately obtained.

What is claimed is:

1. A process for the optical resolution of racemic calcium pantothenate which comprises seeding a supersaturated aqueous methanolic solution of racemic calcium pantothenate with crystals of the desired optically active isomer, said aqueous methanolic solution containing water in an amount of 2 to 15% w./v. and said crystals containing one molecule of water of crystallization and four molecules of methanol of crystallization, and effecting resolution at a temperature between 5° and 15° C. to obtain crystals of the same optically active isomer as the seed crystals.

2. A process according to claim 1 wherein the seeded solution is gently stirred at a speed to prevent the separated crystals from being deposited on the bottom of the reaction vessel.

References Cited

UNITED STATES PATENTS

| | | | |
|---|---|---|---|
| 2,306,646 | 12/1942 | Shildneck | 260—534 |
| 2,341,610 | 2/1944 | Grüssner | 260—534 |
| 2,407,560 | 9/1946 | Kuhn et al. | 260—534 XR |
| 2,957,025 | 10/1960 | Brooks | 260—534 |
| 3,278,572 | 10/1966 | Frump | 260—534 XR |
| 3,260,744 | 7/1966 | Ito et al. | 260—534 |
| 3,266,871 | 8/1966 | Mizoguchi et al. | 260—534 XR |

FOREIGN PATENTS 402,330  6/1965  Japan.

LORRAINE A. WEINBERGER, Primary Examiner

A. P. HALLVIN, Assistant Examiner